(12) United States Patent
Chiang et al.

(10) Patent No.: US 7,522,750 B2
(45) Date of Patent: Apr. 21, 2009

(54) BIOMETRICS VERIFICATION SYSTEM AND A METHOD THEREOF

(75) Inventors: Hsia-Ling Chiang, Taipei (TW); Yeong-Sung Lin, Taipei (TW)

(73) Assignee: International Biometrics Recognition Technologies Co., Ltd., Taipei (TW)

( * ) Notice: Subject to any disclaimer, the term of this patent is extended or adjusted under 35 U.S.C. 154(b) by 859 days.

(21) Appl. No.: 11/037,835

(22) Filed: Jan. 18, 2005

(65) Prior Publication Data
US 2006/0159312 A1 Jul. 20, 2006

(51) Int. Cl.
*G06K 9/00* (2006.01)
(52) U.S. Cl. ............ 382/115; 340/5.53; 340/5.83; 382/209; 713/186
(58) Field of Classification Search ........ 382/115, 382/118, 209; 713/170, 176, 182, 184, 186, 713/202; 340/5.52, 5.53, 5.82, 5.83
See application file for complete search history.

(56) References Cited

U.S. PATENT DOCUMENTS

| | | | | |
|---|---|---|---|---|
| 6,125,185 | A * | 9/2000 | Boesch ............... | 380/285 |
| 6,957,339 | B2 * | 10/2005 | Shinzaki ............. | 713/186 |
| 7,114,079 | B1 * | 9/2006 | Cook et al. .......... | 713/186 |
| 7,239,725 | B2 * | 7/2007 | Dobashi ............. | 382/118 |
| 7,356,705 | B2 * | 4/2008 | Ting .................. | 713/186 |
| 2002/0129251 | A1 * | 9/2002 | Itakura et al. ...... | 713/176 |
| 2003/0172279 | A1 * | 9/2003 | Yudasaka ........... | 713/176 |
| 2004/0255168 | A1 * | 12/2004 | Murashita et al. .. | 713/202 |
| 2006/0159312 | A1 * | 7/2006 | Chiang et al. ...... | 382/115 |

FOREIGN PATENT DOCUMENTS

| JP | 2002352230 A | * | 12/2002 |
|---|---|---|---|
| JP | 2003178274 A | * | 6/2003 |
| JP | 2005196516 A | * | 7/2005 |

* cited by examiner

*Primary Examiner*—Gregory M Desire
(74) *Attorney, Agent, or Firm*—Thomas, Kayden, Horstemeyer & Risley

(57) ABSTRACT

The biometrics verification system uses an application server and an authentication server, where the application server and the authentication server operate in parallel. The application server has a BIC card read module, a BIC card verification module, and a result display module. Whereas, the authentication server has a facial detection module, a facial feature extraction module, and a facial feature matching module. The BIC card read module reads source facial features from a BIC card. The BIC card verification module verifies the source facial features. The result display module displays matching results generated by the facial feature matching module. The facial detection module detects target facial images. The facial feature extraction module extracts target facial features from the target facial images. The facial feature matching module matches the target facial features with the source facial features transmitted via the secure channel service. The facial feature matching module generates the matching results.

26 Claims, 9 Drawing Sheets

BIOMETRICS VERIFICATION SYSTEM AND A METHOD THEREOF

BACKGROUND

1. Field of Invention

The present invention relates to a biometrics verification system. More particularly, the present invention relates to a biometrics verification system utilizing facial features for verification.

2. Description of Related Art

Biometrics recognition is a technology that can recognize biological features of a living subject, such as facial features, a fingerprint, an iris, or a voice. Biometrics recognition technology has various potential applications, particularly in applications requiring access control, such as a security system or a gate control system. When an entrant wants to enter an access control system implemented with a biometrics recognition function, the entrant is required to demonstrate particular biological features, such as facial images or a fingerprint. The system compares these biological features with the biological features of an allowed entrant stored in a database. If the retrieved biological features match the ones stored in the database, the entrant is allowed to access the system.

However, during the comparison, the system compares the retrieved biological features with the features of every allowed entrant stored in a database. Therefore, comparison time required increases significantly when data volume stored in the database increases. Besides, since the biological features of allowed entrants are stored in a database, they are vulnerable to invasion. Once the biological features are revealed, all systems employing the same biological features for recognition are no longer secure and valid.

SUMMARY

The present invention is directed to a biometrics verification system and a biometrics activation system utilizing facial features as the basis for the verification. When a user would like to enter an access-controlled system, the target facial features of the user are detected and extracted. The extracted target facial features of the user are matched with the source facial features. The source facial features to be matched are stored in a Biometrics Integrated Circuit (BIC) card.

It is therefore an objective of the present invention to provide a biometrics verification system for verifying the target facial features of the user.

It is another objective of the present invention to provide a biometrics verification method for verifying the target facial features of the user.

It is still another objective of the present invention to provide a biometrics activation system for establishing source facial features in a BIC card.

It is further still another objective of the present invention to provide a biometrics activation method for establishing source facial features in a BIC card.

According to one objective of the present invention, a biometrics verification system is proposed. The biometrics verification system comprises an application server and an authentication server. The application server and the authentication server operate in a parallel fashion. The application server is composed of a BIC card read module, a BIC card verification module, and a result display module. The authentication server is composed of a facial detection module, a facial feature extraction module, and a facial feature matching module. The BIC card read module reads previously established source facial features from a BIC card. The BIC card verification module verifies the source facial features read by the BIC card read module. The result display module displays matching results generated by the facial feature matching module. The matching results are transmitted from the facial feature matching module via the secure channel service to the result display module. The facial detection module detects target facial images of the user. The facial feature extraction module extracts target facial features from the target facial images detected by the facial detection module. The facial feature matching module matches the target facial features extracted by the facial feature extraction module with the source facial features transmitted from the verification module via the secure channel service. The facial feature matching module then generates the matching results which are transmitted to the result display module for display via the secure channel service.

According to another objective of the present invention, a biometrics verification method is proposed. First, source facial features are read from a BIC card. Next, the source facial features are verified. Then, target facial images of the user are detected. Subsequently, the target facial features are extracted from the detected target facial images. Thereafter, the extracted target facial features are matched with the source facial features transmitted via a secure channel service from the BIC card. Finally, a matching result is generated.

According to still another objective of the present invention, a biometrics activation system for establishing source facial features in a BIC card is proposed. The biometrics activation system includes a facial detection module, a facial feature extraction module, and a facial feature establishing module. The facial detection module detects source facial images of the BIC cardholder. The facial feature extraction module extracts source facial features from the source facial images detected by the facial detection module. The facial feature establishing module writes the extracted source facial features into a BIC card via a secure channel service.

According to further still another objective of the present invention, a biometrics activation method for establishing source facial features in a BIC card is proposed. First, source facial images of the BIC cardholder are detected. Next, source facial features are extracted from the source facial images. Subsequently, the extracted source facial features are written into the BIC card via a secure channel service.

The biometrics verification system and the biometrics activation system according to the present invention provide a more secure and reliable access control mechanism. The target facial features of the entrant are matched with the source facial features stored in a BIC card instead of a massive database.

The matching time required can be significantly reduced. Further, the source facial features of the BIC cardholder are stored in the BIC card instead of a database. The risk that the confidential source facial features might be invaded can be minimized.

It is to be understood that both the foregoing general description and the following detailed description are examples, and are intended to provide further explanation of the invention as claimed.

BRIEF DESCRIPTION OF THE DRAWINGS

These and other features, aspects, and advantages of the present invention will become better understood with regard to the following description, appended claims, and accompanying drawings, where:

DESCRIPTION OF THE PREFERRED EMBODIMENTS

Figure 1:
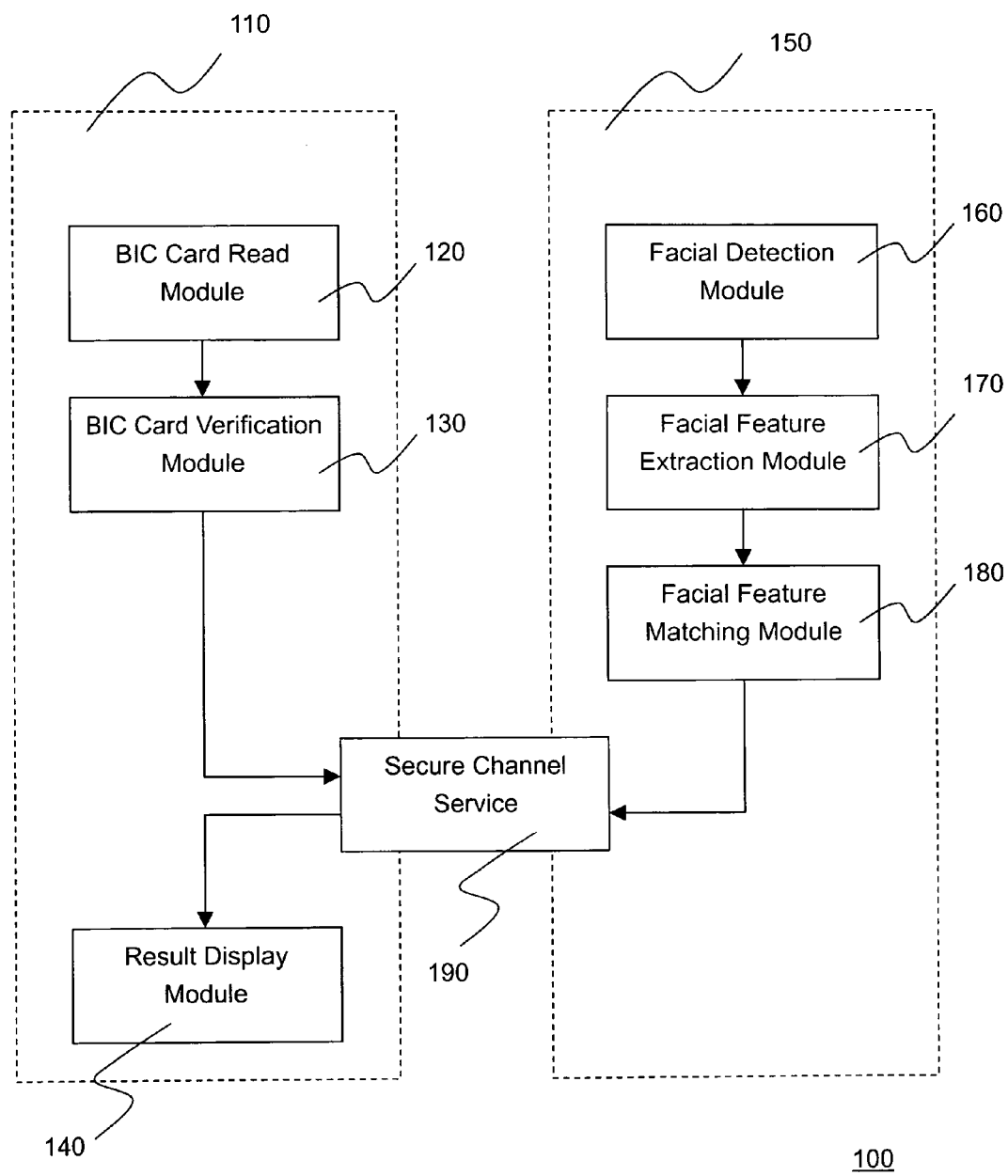
FIG. 1 is a block diagram illustrating a biometrics verification system according to the present invention.

Reference will now be made in detail to the present preferred embodiments of the invention, examples of which are illustrated in the accompanying drawings. Wherever possible, the same reference numbers are used in the drawings and the description to refer to the same or like parts.

The biometrics verification system according to the present invention utilizes facial features as the basis for the verification. When a user would like to enter an access-controlled system, such as an ATM system, a gate control system, or a member card system, the target facial features-of the user are detected and extracted. The extracted target facial features of the user are matched with source facial features. The source facial features to be matched are stored in a Biometrics Integrated Circuit (BIC) card, i.e. an IC card with biometrics data stored thereon. In contrast to the conventional facial recognition technology, where the target facial features are compared with a pool of source facial features stored in a database, the biometrics verification system according to the present invention can significantly reduce the matching time required. Further, since the source facial features are stored in a portable BIC card carried by the user, there is no risk that the confidential source facial features might be invaded by others.

FIG. 1 is a block diagram illustrating a biometrics verification system according to the present invention. The biometrics verification system 100 comprises an application server 110 and an authentication server 150, where the application server 110 and the authentication server 150 operate in parallel. The application server 110 is composed of a BIC card read module 120, a BIC card verification module 130, and a result display module 140. The authentication server 150 is composed of a facial detection module 160, a facial feature extraction module 170, and a facial feature matching module 180. The BIC card read module 120 reads previously established source facial features from a BIC card. The BIC card verification module 130 verifies the source facial features read by the BIC card read module 120. The result display module 140 displays matching results generated by the facial feature matching module 180. The matching results are transmitted from the facial feature matching module 180 via the secure channel service 190 to the result display module 140.

The facial detection module 160 detects target facial images of the user. The facial feature extraction module 170 extracts target facial features from the target facial images detected by the facial detection module 160. The facial feature matching module 180 matches the target facial features extracted by the facial feature extraction module 170 with the source facial features transmitted from the verification module 130 via the secure channel service 190. The facial feature matching module 180 then generates the matching results, which are transmitted to the result display module 140 for display via the secure channel service 190.

Figure 2:
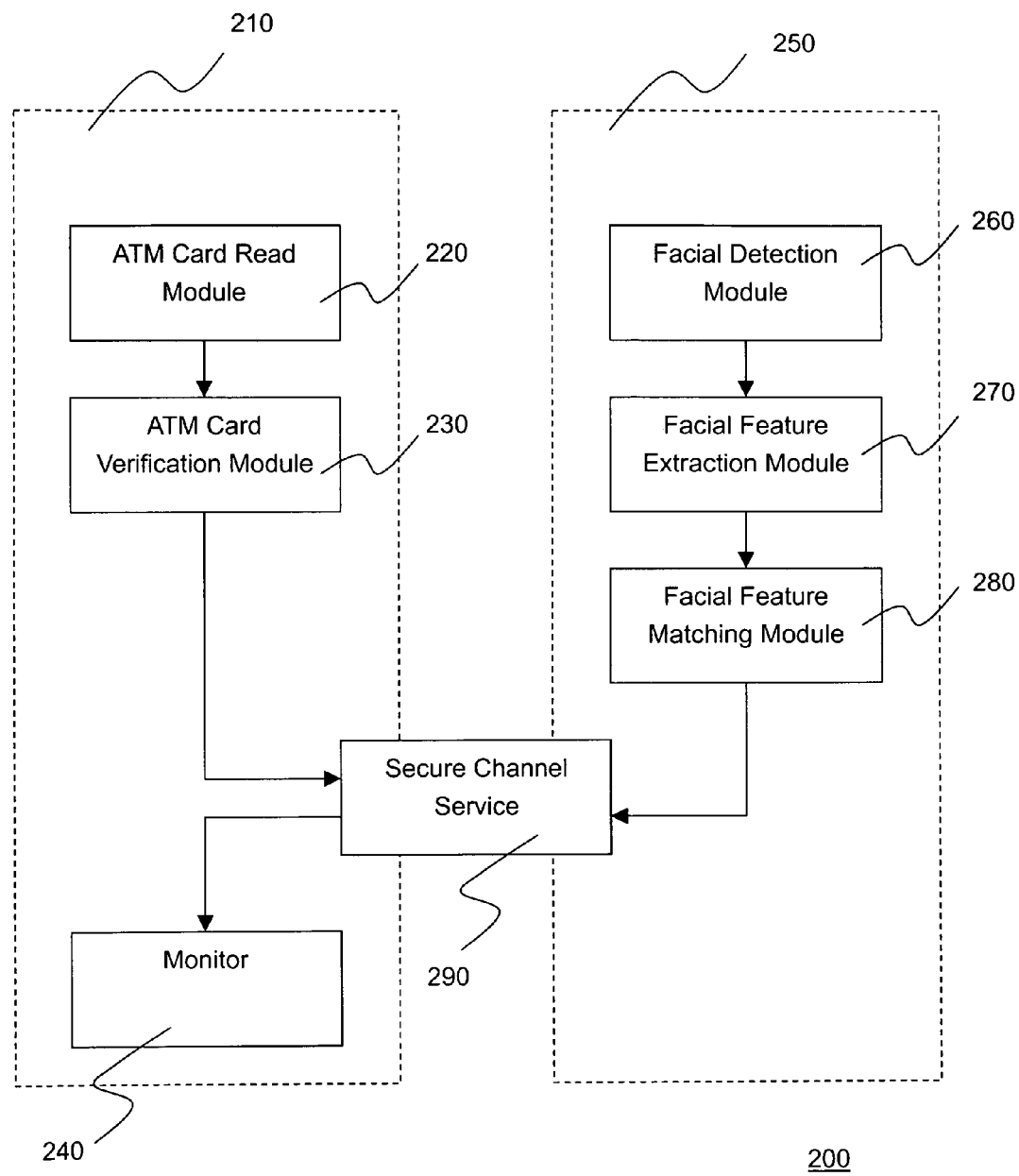
FIG. 2 is a block diagram illustrating one preferred embodiment according to the biometrics verification system of the present invention.

FIG. 2 is a block diagram illustrating one preferred embodiment according to the biometrics verification system of the present invention. The biometrics verification system according to one preferred embodiment of the present invention is implemented in an Automated Teller Machine (ATM) for verifying a user who intends to conduct transactions. The source facial features of the ATM cardholder are previously established and stored in the ATM card.

The ATM 200 comprises an application server 210 and an authentication server 250, where the application server 210 and the authentication server 250 operate in parallel. The application server 210 is composed of an ATM card read module 220, an ATM card verification module 230, and a display 240. The authentication server 250 is composed of a facial detection module 260, a facial feature extraction module 270, and a facial feature matching module 280.

When the user would like to conduct a transaction, such as withdraw money, the user first inserts the ATM card, having source facial features of the ATM cardholder stored thereon, into the ATM 200. The ATM card read module 220 then reads the source facial features of the ATM cardholder from the ATM card inserted. Next, the ATM card verification module 230 verifies whether the source facial features read from the ATM card are authentic or not. Thereafter, the source facial features are transmitted to the facial feature matching module 280 of the authentication server 250 via the secure channel service 290 for matching.

Meanwhile, the facial detection module 260 detects target facial images of the user presented in front of the ATM 200. The facial feature extraction module 270 then extracts target facial features from the target facial images detected by the facial detection module 260. Afterward, the facial feature matching module 280 matches the target facial features extracted by the facial feature extraction module 270 with the source facial features transmitted from the ATM card verification module 230 via the secure channel service 290. If the distance between the source facial features and the target facial features is no greater than a predetermined threshold, an acceptance matching result is generated; otherwise, a rejection matching result is generated. The aforementioned threshold can be calculated, for example, as the distance between the source facial features, considered as a point in a chosen feature space, and the $k^{th}$ nearest neighbors out of N sample points in such feature space; this method is referred to as the (N,k) method. The acceptance or the rejection matching result is transmitted back to the display 240 for display via the secure channel service 290.

Figure 3:
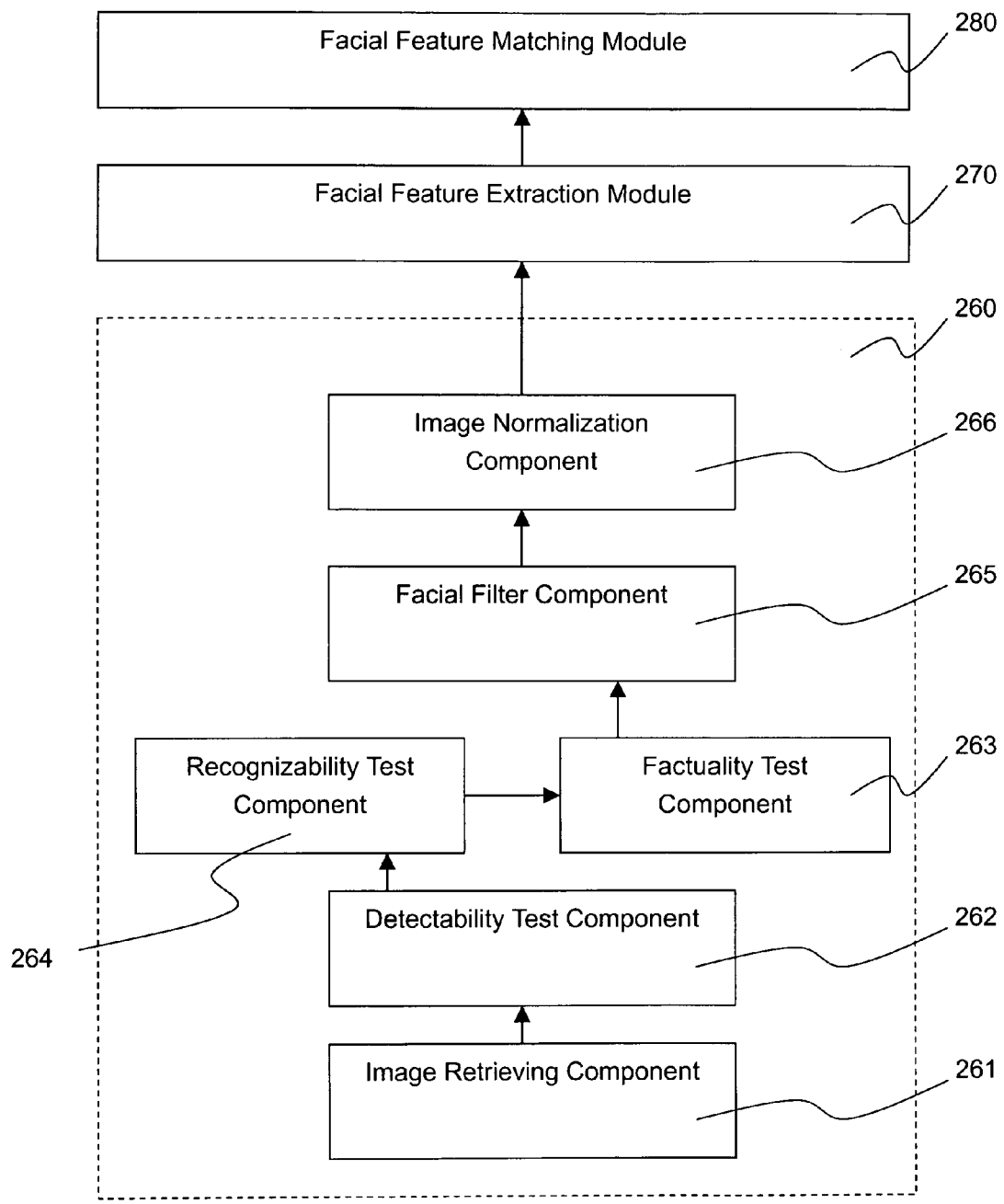
FIG. 3 is a detailed block diagram of the authentication server according to one preferred embodiment of biometrics verification system of the present invention.

FIG. 3 is a detailed block diagram of the authentication server 250. The facial detection module 260 is composed of image retrieving components 261, a detectability test component 262, a factuality test component 263, a recognizability test component 264, a facial filter component 265, and an image normalization component 266.

More than one image retrieving components 261, such as a WebCam, a Charge Coupled Device (CCD), Complementary Metal Oxide Semiconductor (CMOS) or a video camera, are configured with different orientations for retrieving a series of target facial images of the user from various perspectives. Afterward, the target facial images retrieved by each image retrieving component 261 are transmitted to the detectability test component 262 for testing detectability. The detectability test component 262 selects one of the image retrieving components 261 for retrieving the optimum target facial images based on the target facial images transmitted from each image retrieving component 261.

The advantage of employing several image retrieving components 261 and the detectability test component 262 is that regardless of the user's orientation, the detectability test component 262 automatically selects one of the image retrieving components 261 for retrieving the optimum target facial images of the user. Thereafter, the selected image retrieving component 261 continuously retrieves target facial images of the user. The target facial images retrieved by the selected image retrieving component 261 are then transmitted to the recognizability test component 264 for testing recognizability. The recognizability test component 264 selects one optimum target facial image from the target facial images retrieved by the selected image retrieving component 261 for further filtering.

Further, the factuality test component 263 tests factuality of the target facial images retrieved by the selected image retrieving component 261. The factuality test component 263 compares and determines whether a variance exists among the target facial images. Variance among the target facial images represents that the user is indeed a live subject. If no variance exists among the target facial images, the subject may be a dummy. The image retrieving component 261 may need to re-retrieve the target facial images of the user.

After the recognizability test and the factuality test, the selected target facial image is transmitted to the facial filter component 265. The facial filter component 265 employs a filtering technique for filtering the selected target facial image. For example, in the selected target facial image, the user's face may be tilted such that the, plane formed by the two eyes is not horizontal. The facial filter component 265 filters the selected target facial image so that the exact location of the two eyes can be revealed. After locating the eyes, the tilt degree of the user's face can also be obtained. The filtered target facial image is further transmitted to the image normalization component 266. The image normalization component 266 normalizes the target facial image so that the normalized target facial image has the same matching criteria as the source facial features stored in the ATM card.

Next, the target facial image is transmitted to the facial feature extraction module 270 for extracting the target facial features. The facial feature extracting module 270 extracts the target facial features by the Principal Component Analysis (PCA) technique, or other known techniques in the art can be employed. The extracted target facial features are then transmitted to the facial feature matching module 280 for matching with the source facial features transmitted from the ATM card via the secure channel service 290. When the distance between the target facial features and the source facial features is no greater than a predetermined threshold, such as the k value calculated by the previously mentioned (N,k) method, an acceptance matching result is generated; otherwise, a rejection matching result is generated. The predetermined k for calculating the corresponding threshold can be defined by the user or the system administrator, and can be relaxed when a lower False Rejection Rate (FRR) is desired.

Secure channel service transmits the source facial features and the matching result with encryption between the application server and the authentication server. Various encryption transmission techniques, such as RSA private key, IDEA, or DSA techniques, can be employed. For example, when the RSA private key technique is utilized, a random private key is generated for each transmission. This is known as a "one-time-one-pass" strategy. Therefore, a secured transmission of the source facial features or the matching result can be ensured.

The matching result generated by the facial feature matching module 280 is then transmitted to the display 240 of the application server 210 for display. After the acceptance matching result is generated, the user may conduct the transaction. Alternatively, a conventional pin number mechanism can still be used for further verification. For example, after the user passes the biometrics verification system, the user is still required to enter a valid pin number before conducting the transaction. The combination of the biometric verification system and the conventional pin number mechanism can further ensure a more secure and reliable protection for the ATM system.

Figure 4:
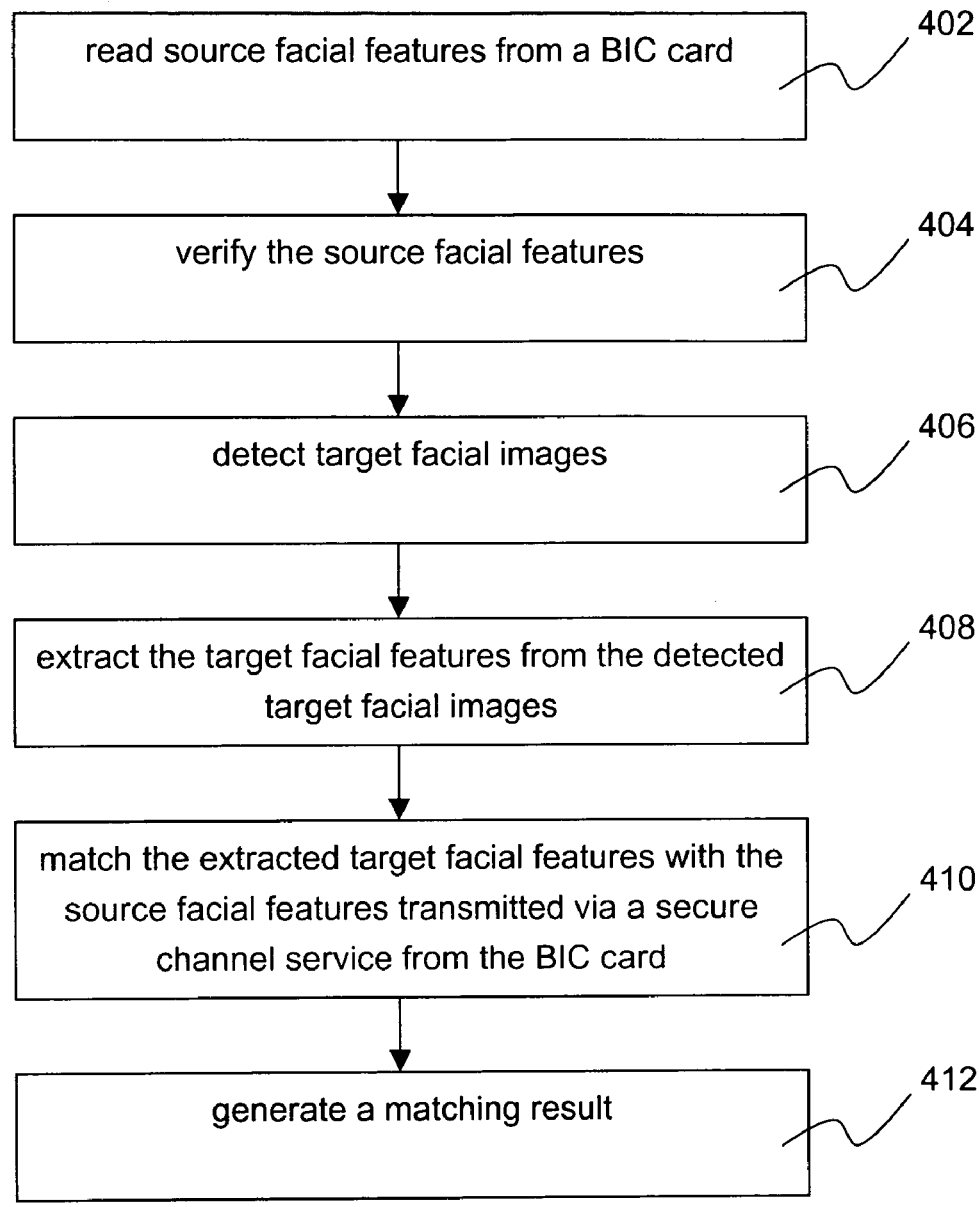
FIG. 4 is a flowchart illustrating the biometrics verification method according to the present invention.

FIG. 4 is a flowchart illustrating the biometrics verification method according to the present invention. First, source facial features are read from a BIC card (step 402). The source facial features are the facial features of the cardholder and are established previously in the BIC card. Next, the source facial features are verified to determine whether the source facial features stored in the BIC card are authentic or not (step 404). Then, target facial images of the user who intends to access the biometrics verification system are detected (step 406). Subsequently, the target facial features are extracted from the detected target facial images (step 408). Thereafter, the extracted target facial features are matched with the source facial features transmitted via a secure channel service from the BIC card (step 410). A secure channel service, such as RSA private key, IDEA, or DSA technique, transmits the source facial features with encryption. Finally, a matching result is generated (step 412). When the distance between the target facial features and the source facial features is no greater than a predetermined threshold, such as the k value calculated by the aforementioned (N,k) method, an acceptance matching result is generated; otherwise, a rejection matching result is generated. The predetermined k for calculating the corresponding threshold can be defined by the user or the system administrator, and can be relaxed when a lower FRR is desired.

Figure 5:
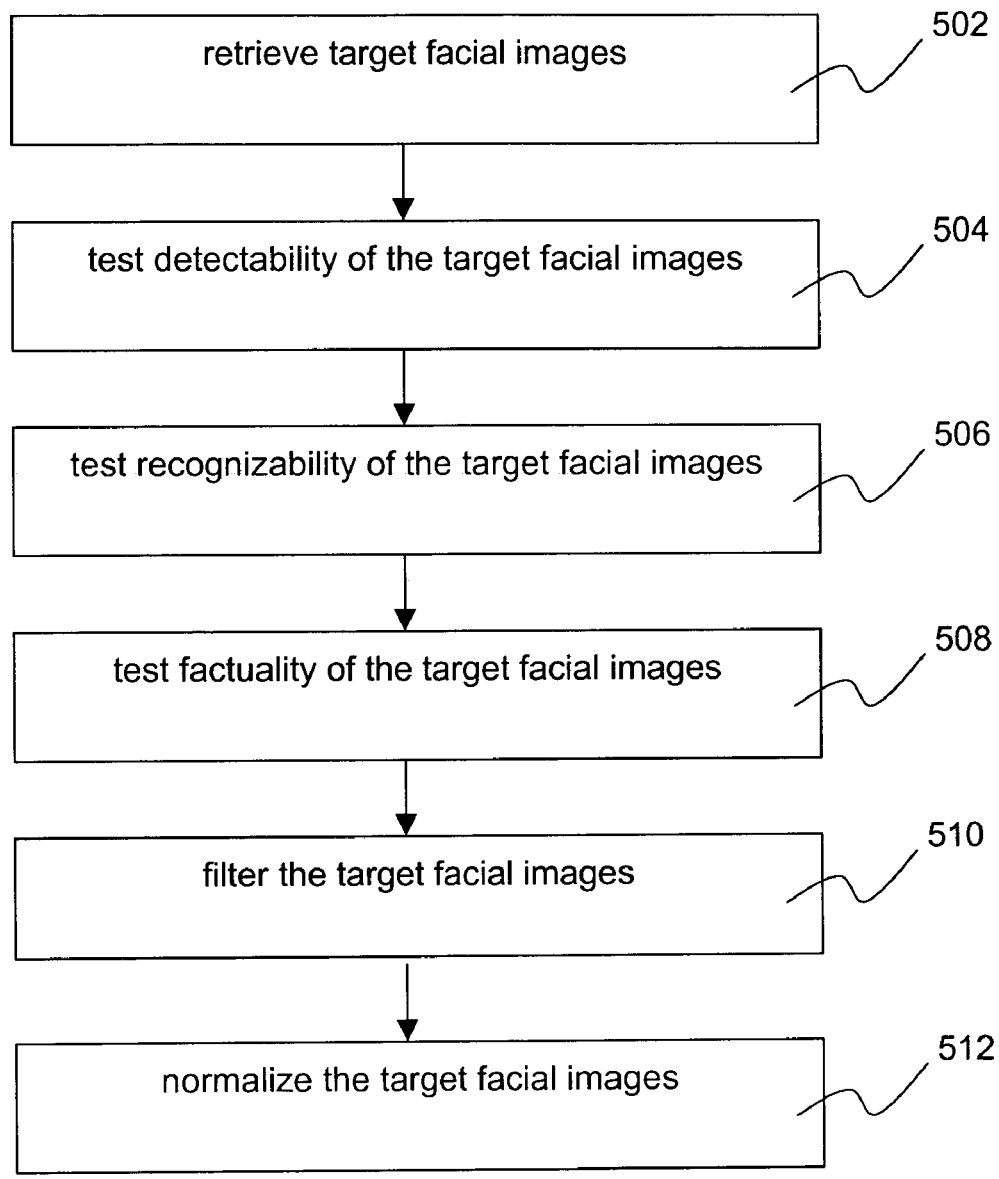
FIG. 5 is a detailed flowchart illustrating the sub-steps for detecting the target facial images according to the biometrics verification method of the present invention.

FIG. 5 is a detailed flowchart illustrating the sub-steps for detecting the target facial images (step 406). The step of detecting the target facial images (step 406) can be divided into several sub-steps. First, target facial images of the user who intends to access the biometrics verification system are retrieved (step 502). The target facial images can be retrieved by various image retrieving components, such as WebCam, CCD, CMOS or video camera. More than one image retrieving components are configured with different orientations for retrieving a series of target facial images of the user from various perspectives.

Next, detectability of the target facial images is tested (step 504). The detectability is tested by selecting an optimum image retrieving component from the image retrieving components for retrieving the optimum target facial images.

Then, recognizability of the target facial images is tested (step 506). The recognizability is tested by selecting an optimum target facial image from the target facial images for further processing.

Further, factuality of the target facial images is tested (step 508). The factuality is tested by comparing the target facial images and determining whether a variance exists among the target facial images. A variance among the target facial images represents that the user is indeed a live subject. If no variance exists among these target facial images, the subject may be a dummy.

Subsequently, the target facial images are filtered (step 510). A filtering technique is employed for filtering the target facial image. For example, in the selected target facial image, the user's face may be tilted such that the plane formed by the two eyes is not horizontal. Therefore, the selected target facial image should be filtered such that the exact location of the two eyes can be revealed. After locating the eyes, the tilt degree of the user's face can also be obtained.

Finally, the target facial images are normalized such that the normalized target facial image has the same matching criteria as the source facial features stored in the ATM card (step 512).

Figure 6:
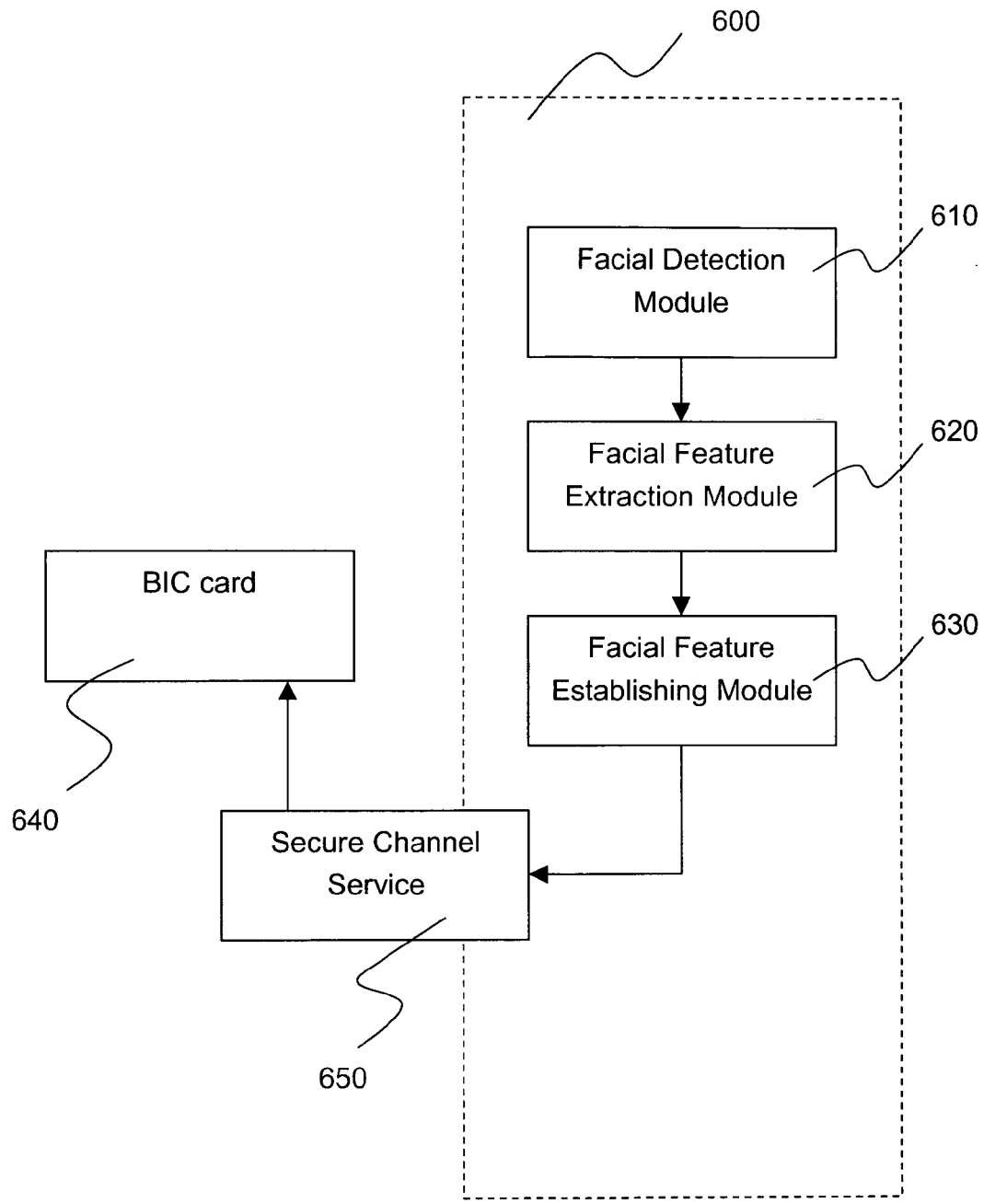
FIG. 6 is a block diagram illustrating a biometrics activation system for establishing source facial features in a BIC card according to the present invention.

The present invention further discloses a biometrics activation system for establishing source facial features in a BIC card. FIG. 6 is a block diagram illustrating a biometrics activation system for establishing source facial features in a BIC card according to the present invention. The biometrics activation system. 600 includes a facial detection module 610, a facial feature extraction module 620, and a facial feature establishing module 630. The facial detection module 610 detects source facial images of the BIC cardholder. The facial feature extraction module 620 extracts source facial features from the source facial images detected by the facial detection module 610. The facial feature establishing module 630 writes the extracted source facial features into a BIC card 640 via a secure channel service 650.

Figure 7:
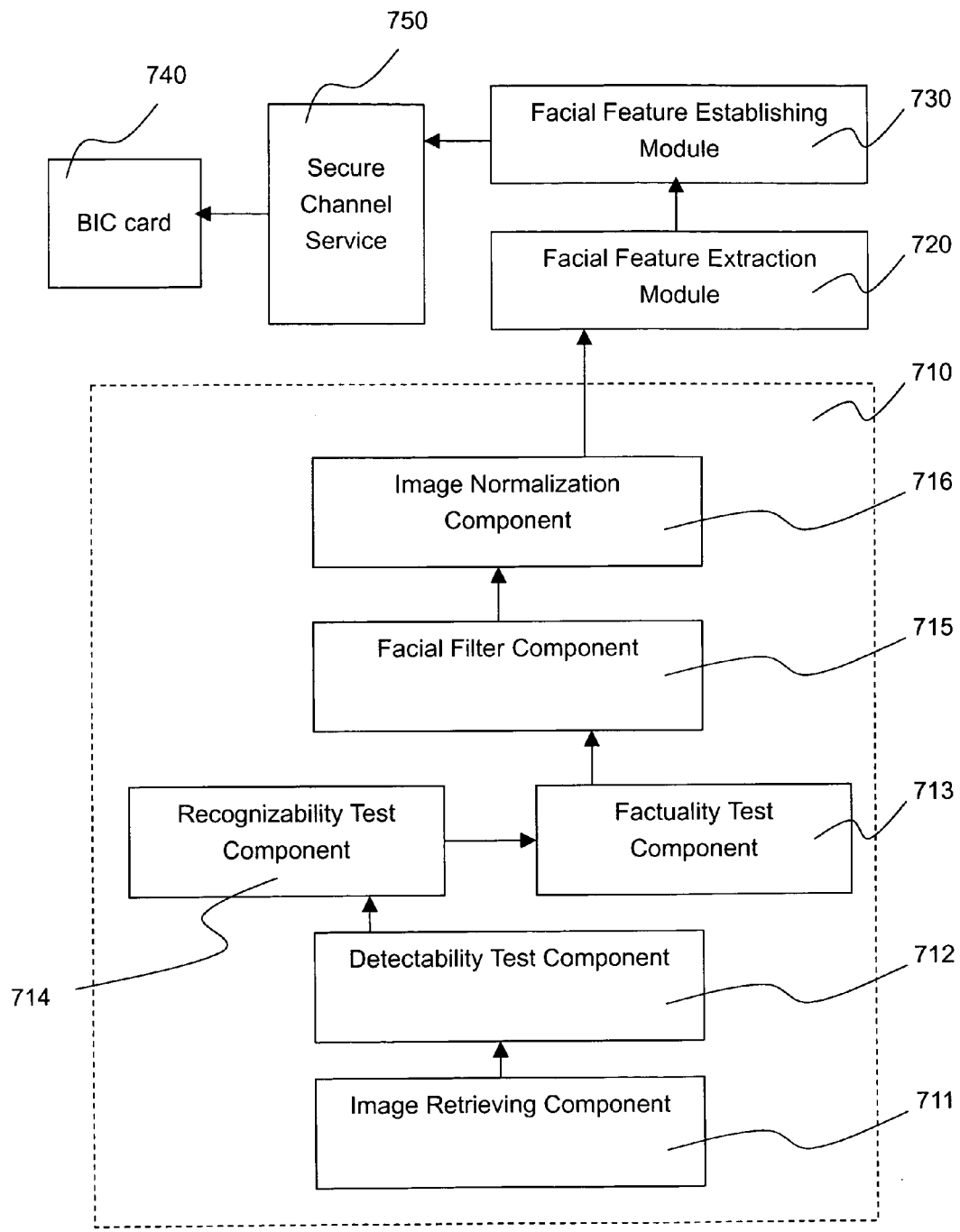
FIG. 7 is a block diagram illustrating one preferred embodiment of the biometrics activation system according to the present invention.

FIG. 7 is a block diagram illustrating one preferred embodiment of the biometrics activation system according to the present invention. The biometrics activation system according to one preferred embodiment of the present invention is implemented for establishing source facial features of the ATM cardholder.

The ATM card biometrics activation system 700 comprises a facial detection module 710, a facial feature extraction module 720, and a facial feature establishing module 730.

When the ATM cardholder would like to establish source facial features in the ATM card, the facial detection module 710 first detects source facial images of the ATM cardholder. The facial feature extraction module 720 then extracts source facial features from the source facial images detected by the facial detection module 710. Subsequently, the facial feature establishing module 730 writes the extracted source facial features into a BIC card 740 via a secure channel service 750.

The facial detection module 710 is further composed of image retrieving components 711, a detectability test component 712, a factuality test component 713, a recognizability test component 714, a facial filter component 715, and an image normalization component 716.

More than one image retrieving component 711, such as a WebCam, a CCD, CMOS or a video camera, are configured with different orientations for retrieving a series of source facial images of the ATM cardholder from various perspectives. Afterward, the source facial images retrieved by each image retrieving component 711 are transmitted to the detectability test component 712 for testing detectability. The detectability test component 712 selects one of the image retrieving components 711 for retrieving the optimum source facial images based on the source facial images transmitted from each image retrieving component 711.

The advantage of employing several image retrieving components 711 and the detectability test component 712 is that, regardless of the ATM cardholder's orientation, the detectability test component 712 automatically selects one of the image retrieving components 711 for retrieving the optimum source facial images of the ATM cardholder. Thereafter, the selected image retrieving component 711 continuously retrieves source facial images of the ATM cardholder. The source facial images retrieved by the selected image retrieving component 711 are then transmitted to the recognizability test component 714 for testing recognizability. The recognizability test component 714 selects one optimum source facial image from the source facial images retrieved by the selected image retrieving component 711 for further filtering.

Further, the factuality test component 713 tests factuality of the source facial images retrieved by the selected image retrieving, component 711. The factuality test component 713 compares and determines whether a variance exists among the source facial images. A variance among the source facial images represents that the ATM cardholder is indeed a live subject. If no variance exists among these source facial images, the subject may be a dummy. The image retrieving component 711 may need to re-retrieve the source facial images of the ATM cardholder.

After the recognizability test and the factuality test, the selected source facial image is transmitted to the facial filter component 715. The facial filter component 715 employs a filtering technique for filtering the selected source facial image. For example, in the selected source facial image, the ATM cardholder's face may be tilted in such a way that the plane formed by the two eyes is not in horizontal. The facial filter component 715 filters the selected source facial image that the exact location of the two eyes can be revealed. After locating the eyes, the tilt degree of the ATM cardholder's face can also be obtained. The filtered source facial image is further transmitted to the image normalization component 716. The image normalization component 716 normalizes the source facial image.

Next, the source facial image is transmitted to the facial feature extraction module 720 for extracting the source facial features. The facial feature extracting module 720 extracts the source facial features by the Principal Component Analysis (PCA) technique, or other known techniques in the art can be employed.

Later, the extracted source facial features are transmitted to the facial feature establishing module 730 for writing the source facial features into the BIC card 740 via the secure channel service 750.

Secure channel service transmits the source facial features to the BIC card 740 with encryption. Various encryption transmission techniques, such as RSA private key, IDEA, or DSA techniques can be employed. For example, when the RSA private key technique is utilized, a random private key is generated for each transmission. This is known as a "one-time-one-pass" strategy. Therefore, a secured transmission of the source facial features can be ensured.

Figure 8:
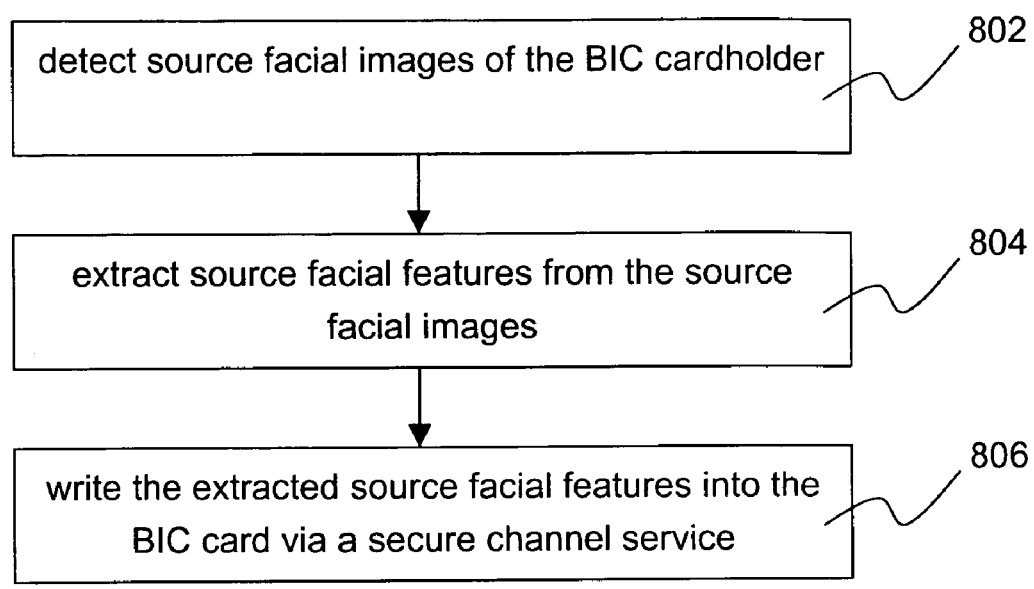
FIG. 8 is a flowchart illustrating a biometrics activation method for establishing source facial features in a BIC card according to the present invention.

FIG. 8 is a flowchart illustrating a biometrics activation method for establishing source facial features in a BIC card according to the present invention. First, source facial images of the BIC cardholder are detected (step 802). Next, source facial features from the source facial images are extracted (step 804). Subsequently, the extracted source facial features are written into the BIC card via a secure channel service (step 806). A secure channel service, such as RSA private key, IDEA, or DSA technique, transmits the source facial features with encryption.

Figure 9:
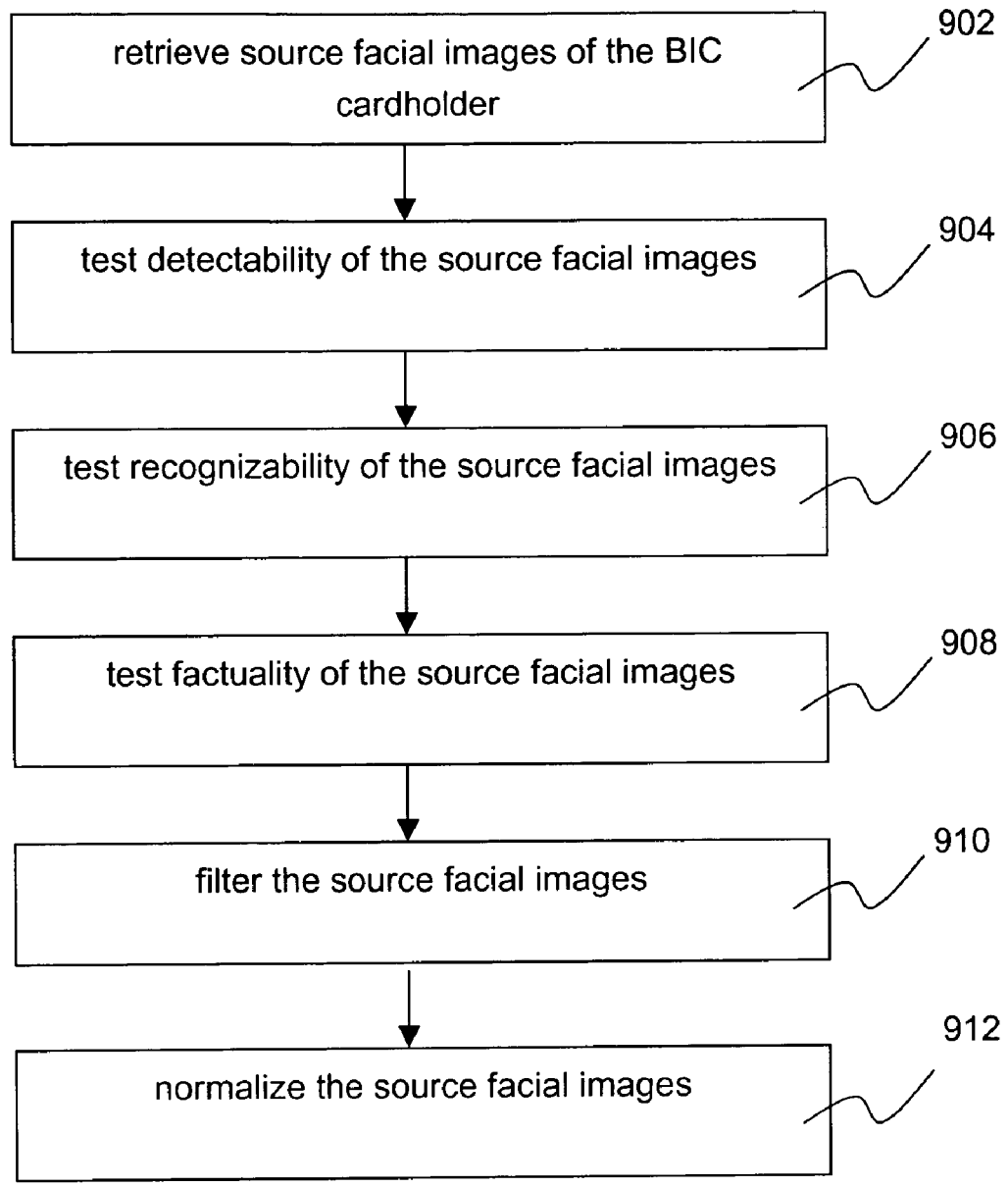
FIG. 9 is a detailed flowchart illustrating the sub-steps for detecting the source facial images of the BIC cardholder according to the biometrics activation method of the present invention.

FIG. 9 is a detailed flowchart illustrating the sub-steps for detecting the source facial images of the BIC cardholder (step 802). The step of detecting the source facial images (step 802) can be divided into several sub-steps. First, source facial images of the BIC cardholder are retrieved (step 902). The source facial images can be retrieved by various image retrieving components, such as a WebCam, a CCD, CMOS or a video camera. More than one image retrieving components are configured with different orientations for retrieving a series of source facial images of the user from various perspectives.

Next, detectability of the source facial images is tested (step 904). The detectability is tested by selecting an optimum image retrieving component from the image retrieving components for retrieving the optimum source facial images.

Then, recognizability of the source facial images is tested (step 906). The recognizability is tested by selecting an optimum source facial image from the source facial images for further processing.

Further, factuality of the source facial images is tested (step 908). The factuality is tested by comparing the source facial images and determining whether variance exists among the source facial images. Variance among the source facial images indicates that the user is indeed a live subject. If no variance exists among these source facial images, the subject may be a dummy.

Subsequently, the source facial images are filtered (step 910). A filtering technique is employed for filtering the source facial image. For example, in the selected source facial image, the user's face may be tilted such that the plane formed by the two eyes is not horizontal. Therefore, the selected source facial image should be filtered such that the exact locations of the two eyes can be revealed. After locating the eyes, the tilt degree of the user's face can also be obtained. Finally, the source facial images are normalized (step 912).

The biometrics verification system and biometrics activation system according to the present invention can be implemented in various fields, such as distance-learning systems, intelligence building surveillance systems, contents web pricing systems, gate control systems, member card systems, access control systems, e-passport systems, personal ID systems, imported labor card systems, personalize remote control systems, network security systems, or e-commerce systems.

The biometrics verification system and the biometrics activation system according to the present invention provide a more secure and reliable access control mechanism. The target facial features of the entrant are matched with the source facial features stored in a BIC card instead of a massive database. The matching time required can be significantly reduced. Besides, the source facial features of the BIC cardholder are stored in the BIC card instead of a database. The risk that those confidential source facial features might be invaded can be minimized.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A biometrics verification system, the biometrics verification system comprising:
   an application server, the application server comprising:
   a BIC card read module for reading source facial features from a BIC card;
   a BIC card verification module for verifying the source facial features;
   a result display module for display a matching result;
   an authentication server, the authentication server comprising:
   a facial detection module for detecting target facial images, wherein the facial detection module comprises a plurality of image retrieving components for retrieving the target facial images and a detectability test component for testing detectability of the target facial images;
   a facial feature extraction module for extracting target facial features from the target facial images, and;
   a facial feature matching module for matching the target facial features with the source facial features transmitted via a secure channel service from the BIC card verification module and generating the matching result.

2. The biometrics verification system of claim 1, wherein the secure channel service is an RSA private key.

3. The biometrics verification system of claim 1, wherein the facial detection module comprises a plurality of image retrieving components for retrieving the target facial images.

4. The biometrics verification system of claim 3, wherein the image retrieving component is a WebCam, COD, CMOS or video camera.

5. The biometrics verification system of claim 1, wherein the detectability test component selects an optimum image retrieving component from the image retrieving components for retrieving the target facial images.

6. The biometrics verification system of claim 1, wherein the facial detection module comprises a recognizability test component for testing recognizability of the target facial images.

7. The biometrics verification system of claim 6, wherein the recognizability test component selects an optimum target facial image from the target facial images.

8. The biometrics verification system of claim 1, wherein the facial detection module comprises a factuality test component for testing factuality of the target facial images.

9. The biometrics verification system of claim 8, wherein the factuality test component compares variance among the target facial images.

10. The biometrics verification system of claim 1, wherein the facial detection module comprises a facial filter component for filtering the target facial images.

11. The biometrics verification system of claim 10, wherein the facial filter component filters the target facial images by a filtering technique.

12. The biometrics verification system of claim 1, wherein the facial detection module comprises a normalization component for normalizing the target facial images.

13. The biometrics verification system of claim 1, wherein the biometrics verification system is implemented in ATM systems, distance-learning systems, intelligence building surveillance systems, contents web pricing systems, gate control systems, member card systems, access control systems, e-passport systems, personal ID systems, imported labor card systems, personalize remote control systems, network security systems, or e-commerce systems.

14. A biometrics verification method, the biometrics verification method comprising:
   reading source facial features from a BIC card;
   verifying the source facial features;
   detecting target facial images, wherein the step of detecting the target facial images comprises a sub-step of testing detectability of the target facial images;
   extracting target facial features from the target facial images;

matching the target facial features with the source facial features transmitted via a secure channel service; and generating a matching result.

15. The biometrics verification method of claim 14, wherein the secure channel service is an RSA private key.

16. The biometrics verification method of claim 14, wherein the step of detecting the target facial images comprises a sub-step of retrieving the target facial images.

17. The biometrics verification method of claim 16, wherein the target facial images are retrieved by a WebCam, COD, CMOS or video camera.

18. The biometrics verification method of claim 14, wherein the detectability of the target facial images is tested by selecting an optimum image retrieving component from image retrieving components for retrieving the target facial images.

19. The biometrics verification method of claim 14, wherein the step of detecting the target facial images comprises a sub-step of testing recognizability of the target facial images.

20. The biometrics verification method of claim 19, wherein the recognizability of the target facial images is tested by selecting an optimum target facial image from the target facial images.

21. The biometrics verification method of claim 14, wherein the step of detecting the target facial images comprises a sub-step of testing factuality of the target facial images.

22. The biometrics verification method of claim 21, wherein the factuality of the target facial images is tested by comparing variance among the target facial images.

23. The biometrics verification method of claim 14, wherein the step of detecting the target facial images comprises a sub-step of filtering the target facial images.

24. The biometrics verification method of claim 23, wherein the target facial images are filtered by a filtering technique.

25. The biometrics verification method of claim 14, wherein the step of detecting the target facial images comprises a sub-step of normalizing the target facial image.

26. The biometrics verification method of claim 14, wherein the biometrics verification system is implemented in ATM systems, distance-learning systems, intelligence building surveillance systems, contents web pricing systems, gate control systems, member card systems, access control systems, e-passport systems, personal ID systems, imported labor card systems, personalize remote control systems, network security systems, or e-commerce systems.

* * * * *